United States Patent
Blades

(10) Patent No.: US 9,260,178 B2
(45) Date of Patent: Feb. 16, 2016

(54) PACKER ASSEMBLY

(75) Inventor: Paul Blades, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 657 days.

(21) Appl. No.: 13/114,077

(22) Filed: May 24, 2011

(65) Prior Publication Data

US 2011/0293362 A1  Dec. 1, 2011

(30) Foreign Application Priority Data

May 27, 2010 (GB) .................................. 1008858.1

(51) Int. Cl.
*B64C 3/50* (2006.01)
*B64C 7/00* (2006.01)
*B64C 9/16* (2006.01)
*F16B 11/00* (2006.01)

(52) U.S. Cl.
CPC ... *B64C 7/00* (2013.01); *B64C 9/16* (2013.01); *F16B 11/006* (2013.01); *Y10T 29/49902* (2015.01); *Y10T 403/47* (2015.01); *Y10T 403/477* (2015.01); *Y10T 403/75* (2015.01); *Y10T 428/24521* (2015.01)

(58) Field of Classification Search
CPC .............................. B64C 2003/147; B64C 3/50
USPC ........... 403/187, 188, 205, 267, 403, 85, 265, 403/335, 336, 337, 230, 262, 408.1; 244/131, 132
See application file for complete search history.

(56) References Cited

U.S. PATENT DOCUMENTS

| | | | | |
|---|---|---|---|---|
| 1,331,150 A | * | 2/1920 | Hooper ........................ | 244/132 |
| 3,382,630 A | * | 5/1968 | Chivers .......................... | 52/208 |
| 4,047,341 A | * | 9/1977 | Bernardi ...................... | 403/230 |
| 4,365,779 A | * | 12/1982 | Bates et al. ................... | 248/371 |
| 4,556,592 A | * | 12/1985 | Bannink, Jr. ................. | 403/267 |
| 4,594,026 A | * | 6/1986 | Hauer et al. ............... | 403/408.1 |
| 4,611,692 A | * | 9/1986 | Everett ....................... | 403/408.1 |
| 4,674,712 A | * | 6/1987 | Whitener et al. ............. | 244/131 |
| 5,014,934 A | * | 5/1991 | McClaflin .................... | 244/132 |
| 5,086,996 A | * | 2/1992 | Roeder et al. ................ | 244/131 |
| 6,276,866 B1 | * | 8/2001 | Rutan .......................... | 403/375 |

(Continued)

FOREIGN PATENT DOCUMENTS

WO  2008123893  10/2008

OTHER PUBLICATIONS

Search Report for Application No. GB1008858.1 mailed Sep. 22, 2010.

*Primary Examiner* — Michael P Ferguson
(74) *Attorney, Agent, or Firm* — Hauptman Ham, LLP

(57) ABSTRACT

An assembly comprising first and second structural components and a packer disposed between the first and second components, wherein the first component and the packer have mating part-spherical surfaces, and the first and second components are fixed relative to one another. Also, a method of aligning first and second structural components relative to one another to form an assembly, the method comprising bringing together first and second structural components with a packer disposed between the components, wherein the first component and the packer have mating part-spherical surfaces, sliding adjustment of the first component relative to the packer until the first and second components are aligned in a desired relationship, and then fixing the first and second components relative to one another.

7 Claims, 5 Drawing Sheets

(56) References Cited

U.S. PATENT DOCUMENTS

| | | | |
|---|---|---|---|
| 7,721,495 B2 * | 5/2010 | Kismarton | 52/309.16 |
| 7,992,822 B2 * | 8/2011 | Kato et al. | 244/132 |
| 8,016,237 B2 * | 9/2011 | Berry et al. | 244/131 |
| 2009/0001238 A1 * | 1/2009 | Hoel | 248/372.1 |
| 2009/0065644 A1 * | 3/2009 | Jacques | 244/123.1 |
| 2011/0215202 A1 * | 9/2011 | Rhoden et al. | 244/131 |

\* cited by examiner

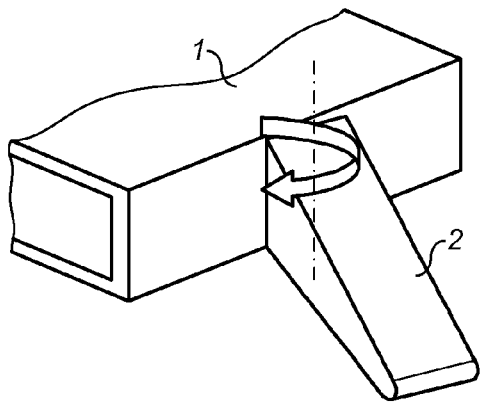
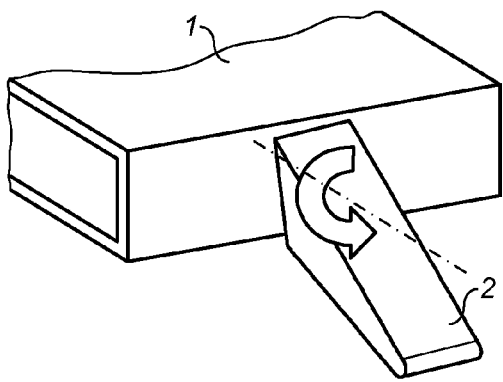
FIG. 3a    FIG. 3b
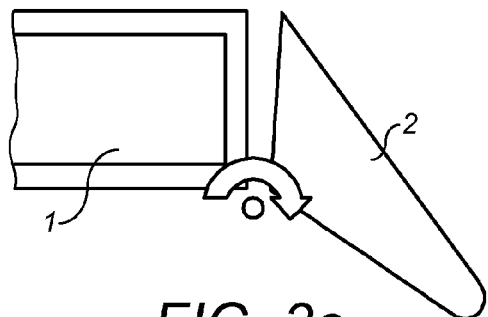
FIG. 3c
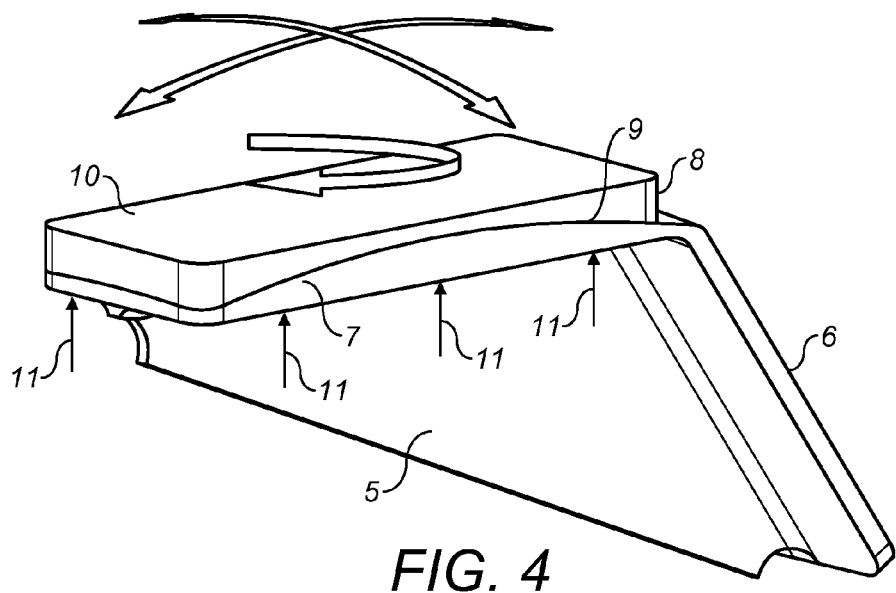
FIG. 4

PACKER ASSEMBLY

RELATED APPLICATIONS

The present application is based on, and claims priority from, Great Britain Application Number 1008858.1, filed May 27, 2010, the disclosure of which is hereby incorporated by reference herein in its entirety.

FIELD OF THE INVENTION

The present invention relates to an assembly comprising first and second structural components with a packer disposed between them.

BACKGROUND OF THE INVENTION

During the assembly of complex structures such as aircraft wings where the close fit of various sections is critical in the transfer of load and aerodynamic performance, or important in ensuring excessive build loads are not introduced during assembly, much time and expense is expended understanding, managing and mitigating tolerance build up.

These tolerances can consist of variations in length, thickness, width, angle, and profile all acting in combination. Traditionally these tolerances are analysed in detail during the design phase and a datum structure and allowable range defined. In the case of complex surfaces containing three dimensional curvature such as aircraft wings a point may be reached where datum structures between different parts compete for control of features critical for performance, such as aerodynamic profile, or manufacturability.

Often the cost of further improvements in control over these features has to be balanced against increasingly complex tolerance chains, so it may also be necessary to consider the time needed to assemble such complex structures.

In such cases a convenient way of compensating for various tolerances that still allows the primary performance drivers to meet their requirements will benefit cost, ease of assembly and performance.

Shimming is often used to provide compensation for manufacturing tolerances. However, it is not always acceptable in highly loaded joints for stress or material compatibility reasons. Fettling is also possible but time consuming, and in the case of aircraft structure may require highly skilled operators and machinery if complex parts are to be machined to fit during the assembly phase. The adoption of composites with their inherent limitations in machineability and health and safety limitations on dust creation also provide significant manufacturing challenges.

Significant gains in productivity can be made in areas where complex tolerance interactions can be simply mitigated.

SUMMARY OF THE INVENTION

A first aspect of the invention provides an assembly comprising first and second structural components and a packer disposed between the first and second components, wherein the first component and the packer have mating part-spherical surfaces, and the first and second components are fixed relative to one another.

A further aspect of the invention provides a method of aligning first and second structural components relative to one another to form an assembly, the method comprising bringing together first and second structural components with a packer disposed between the components, wherein the first component and the packer have mating part-spherical surfaces, sliding adjustment of the first component relative to the packer until the first and second components are aligned in a desired relationship, and then fixing the first and second components relative to one another.

The invention is advantageous in that the matching part-spherical surfaces mitigate angular tolerances on assembly.

The part-spherical surfaces can permit sliding adjustment between the first component and the packer during assembly about any of three orthogonal axes of rotation. The components can be aligned by rotation in their vertical axis, a compound angular deflection between the two components, or any combination thereof.

The second component and the packer may have mating surfaces. These mating surfaces may be substantially planar or may have curvature.

The assembly may further include a second packer disposed between the packer and the second component. The second packer may be desirable where an increased packer thickness is required.

The part-spherical surfaces preferably have a central dihedral angle ($\theta$) of less than approximately 5 degrees. In other words, the part-spherical surface has a large radius of curvature. The large spherical radius ensures that the overall stack height of the packer is not significantly increased compared to prior art packers. Also, the large spherical radius ensures good frictional contact between the packer and the first component. Preferably, the angular variation (in any of three orthogonal directions) to be washed out using the spherical packer is less than 1 degree. With such a low angular variation, the consequential thickness variation due to the adjustment may be negligible.

The first and second components may be fixed by fasteners, such as bolts. Once the components have been aligned holes may be drilled off through the components and the fasteners then installed in the holes to fix the components relative to one another. The first component may have fastener holes pre-drilled prior to assembly, and the fastener holes in the packer and second component may be drilled off from these pre-drilled holes. Alternatively, the packer may also have pre-drilled fastener holes which are deliberately oversize to accommodate adjustment of the first component relative to the packer to wash out angular tolerance.

The packer preferably has a concave part-spherical surface and the first component has a mating convex part-spherical surface. Although the packer may have a central region of reduced thickness (due to the part-spherical surface) compared with a conventional packer of substantially constant thickness, the reduction in build stress as a result of washing out the angular tolerance on assembly at least partially compensates so that the packer remains within stress allowables.

Instead of fastening the first and second components, these may be fixed by welding or bonding, or any other viable method. For example, if the packer and components are made of steel then welding would be viable.

The packer may be a low strength material but could alternatively be adapted to carry significant load. In highly loaded areas, some fretting protection may be required at the interface between the packer and the components. For example, the packer may be made of Titanium, corrosion resistant steel, or Aluminium alloy for fret resistance. In a preferred embodiment, the first component is made of Aluminium and the packer is made of Titanium.

The part-spherical surfaces may be formed by machining This may form part of a computer aided design/manufacture process.

A sealant layer may be provided between the packer and the first and/or second components. For example, an interfay sealant may be used.

BRIEF DESCRIPTION OF THE DRAWINGS

Embodiments of the invention will now be described with reference to the accompanying drawings, in which:

FIG. 3 illustrate examples of angular misalignment between the wing box and the cantilever rib as rotation about the vertical axis (FIG. 3a), rotation about the fore/aft axis (FIG. 3b), and rotation about the span-wise axis (FIG. 3c);

FIG. 4 illustrates a three-dimensional view of the rib to cover bracket and spherical packer;

DETAILED DESCRIPTION OF EMBODIMENT(S)

Figure 1:
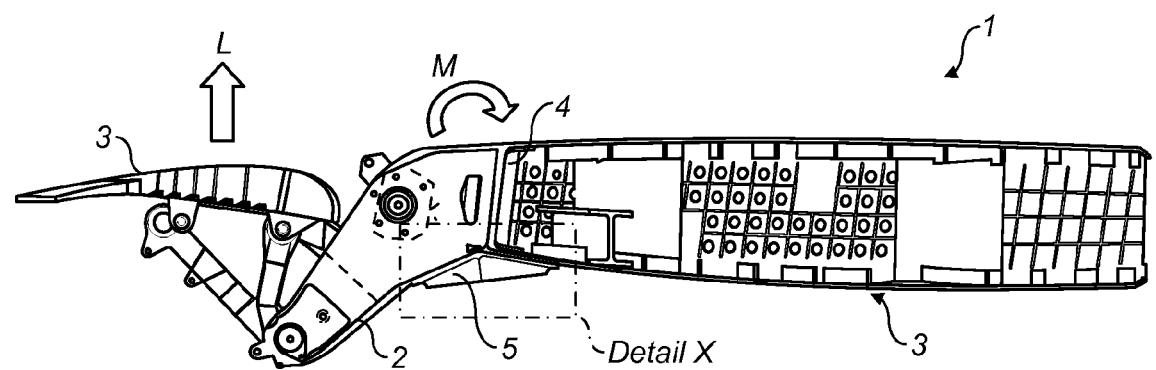
FIG. 1 illustrates a partial section view through an aircraft wing showing a joint between a cantilevered flap support rib and a wing box, with a rib to cover attachment bracket between the rib and the lower cover of the wing box.
Figure 2:
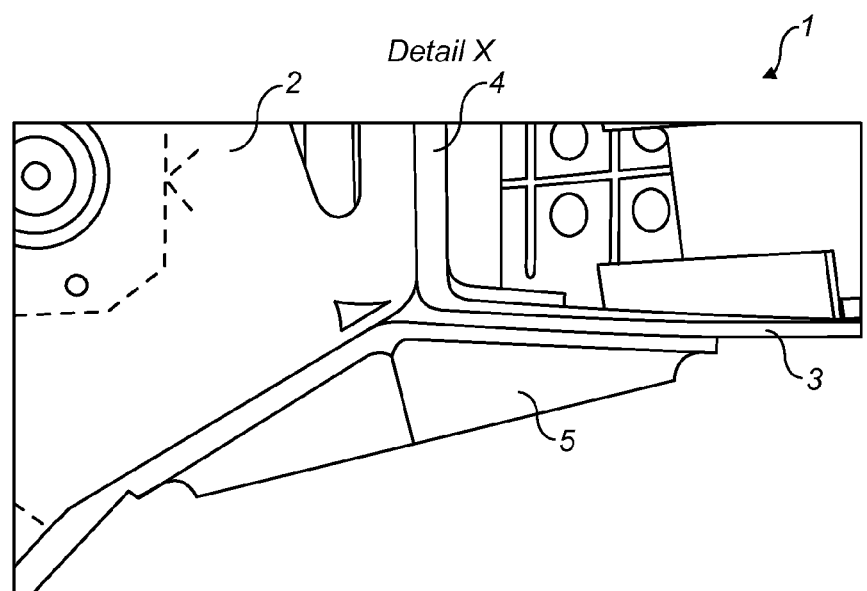
FIG. 2 illustrates detail X of FIG. 1 showing the rib to cover attachment bracket.

FIG. 1 illustrates a partial section view through an aircraft wing 1 having a wing box and a cantilevered flap support rib 2 which supports a moveable flap 3. The junction between the cantilevered flap rib 2 and the wing box lower cover (skin) 3 is a highly loaded area. Aerodynamic loads, L, generated by the flap 3 generate moment, M, which has be transferred into both the rear spar 4 and the lower cover 3 of the wing box. Cover loads are transferred into the cover 3 via a rib-to-cover attachment bracket 5. The rib-to-cover attachment bracket 5 is shown in detail in FIG. 2.

The complex curvature of the lower cover 3 in combination with the positional and angular tolerances of the cantilever rib 2 relative to the cover 3 mean that integrating a load bearing member that is able to allow for all possible tolerance variations and yet still effectively transfer load into the cover is compromised. Such tolerances may include: cover curvature variations in both the span-wise and fore/aft directions; angular misalignment between the rib 2 and rear spar 4, and/or between the rib 2 and the lower cover 3; positional tolerance variations in the rear spar 4 and/or the cantilever rib 2; or any combination of these.

FIGS. 3a-3c illustrate a simplified cantilever rib 2 to wing 1 interface. It can be seen that the angular component of these tolerances can be broken down into their respective vertical, fore/aft and span-wise axis. FIG. 3a illustrates rotation about the vertical axis; FIG. 3b illustrates rotation about the fore/aft axis; and FIG. 3c illustrates rotation about the span-wise axis. It will be appreciated that these Figures are schematic and over exaggerate the extent of misalignment, which would typically be at most only one or two degrees in any of these three axes of rotation.

FIG. 4 illustrates the bracket 5 having a substantially planar mounting surface 6 for attachment to the cantilever rib 2, and a part spherical mounting surface 7. On top of the part spherical mounting surface 7 is a packer 8, the underside of which has a part spherical surface 9 of substantially the same sphere radius, r, as the surface 7. The bracket 5 is adapted for mounting to the lower cover 3 via the packer 8. The packer 8 has an upper surface 10 for mounting against the lower cover 3. Arrows 11 indicate bolting positions for bolting through the bracket 5 and the packer 8 to the lower cover 3.

Therefore, in this embodiment, the bracket 5 is the "first structural component", the lower cover 3 is the "second structural component" and the packer 8 is disposed between the two components.

It can be seen that any deviation between the lower cover 3 and the cantilever rib 2 due to the angular misalignment illustrated in FIGS. 3a-3c, can be accommodated by relative movement between the part spherical surfaces 7, 9 of the bracket 5 and packer 8. Regardless of whether the tolerances include cover profile deviations, or rib to cover angular deviations, the use of interfacing part spherical surfaces 7, 9 allows for complex combinations of compound angles to be accommodated without the need for complex measurements or machining operations during assembly.

Figure 5:
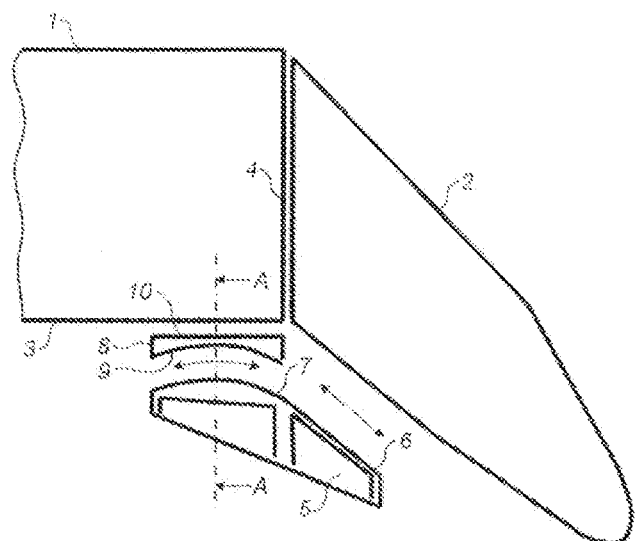
FIG. 5 illustrates a side view of the rib to cover bracket and spherical packer.

FIG. 5 illustrates schematically a section through the trailing edge of the aircraft wing 1 shown in FIG. 1 during assembly. The cantilever rib 2 is attached to the rear spar 4 of the wing 1 in a conventional manner. The bracket 5 and the packer 8 are positioned such that their part spherical surfaces 7, 9 are mated together. Bringing the bracket 5 and the packer 8 into contact with the lower surface of the cover 3 and the lower surface of the cantilever rib 2, the various angular tolerances are washed out. The upper surface 10 of the packer 8 interfaces with the outer surface of the lower cover 3. Rib to cover tolerances in the vertical direction are accommodated by sliding the bracket 5 up or down the substantially planar underside of the rib 2. The part spherical mating surfaces 7, 9 of the bracket 5 and packer 8 slide relative to one another to accommodate rotational misalignment about the fore/aft axis and about the span-wise axis. Once all mating surfaces of the packer 8 and bracket 5 have been brought into a desired alignment with the lower cover 3 and the cantilever rib 2, the bracket 5 is fixed to both the lower cover 3 and the cantilever rib 2.

Figure 6:
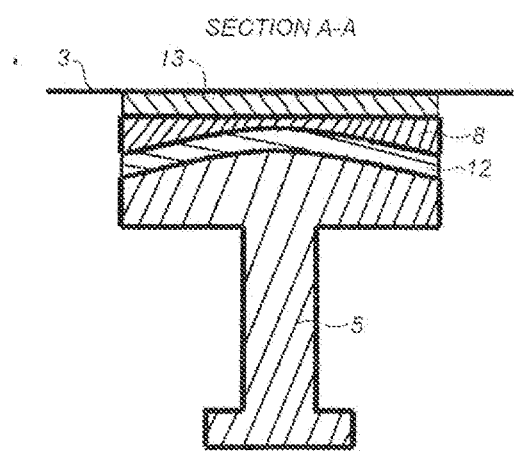
FIG. 6 illustrates a section view on A-A in FIG. 5.

FIG. 6 illustrates a section view along line A-A in FIG. 5. As can be seen from FIG. 6, a layer of interfay sealant 12 may be provided between the part spherical surface 9 of the packer 8 and the part spherical surface 7 of the bracket 5. Another layer of interfay sealant 13 may also be provided between the upper surface 10 of the packer 8 and the outer surface of the lower cover 3. In this embodiment, the cover 3 to packer 8 interface is simplified by providing a substantially planar interfacing pad on the outer surface of the lower cover 3 and making the upper surface 10 of the packer substantially planar. However, the outer surface of the cover 3 can alternatively have complex curvature and the upper surface 10 of the packer can have a matching profile.

Once the packer 8 and the bracket 5 have been slidingly adjusted relative to one another and against the lower cover 3 and the rib 2, fastener holes may be drilled off through the bracket 5 and packer 8 into the lower cover 3 and also through the bracket 5 into the cantilever rib 2. Suitable fasteners, such as bolts, may be located in the fastener holes and tightened to fix the bracket 5 to the lower cover 3 and to the rib 2.

Figure 7:
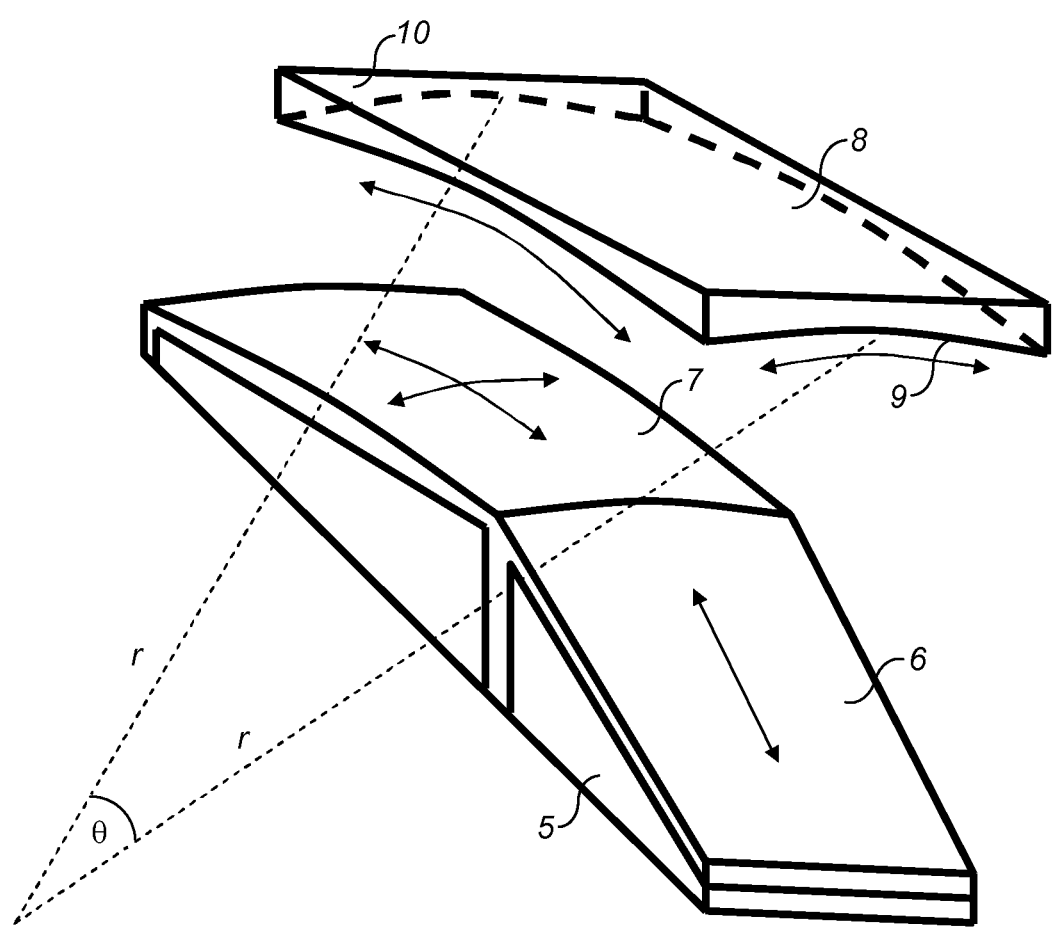
FIG. 7 illustrates an exploded three-dimensional view of the rib to cover bracket and spherical packer.

FIG. 7 illustrates a schematic, exploded view of the bracket 5 and packer 8 showing in detail the mating part spherical surfaces 7, 9. As can be seen, the part spherical surfaces 7, 9 are projected from a common sphere of radius, r, over a central dihedral angle, θ.

In the embodiment described above, the packer 8 is machined from Titanium as this provides good fret resistance at the part spherical mating surfaces 7, 9. Alternatively, corrosion resistant steel or Aluminium alloy may be used. The part spherical mating surfaces 7, 9 have a large sphere radius so as to minimise the stack height of the packer 8 and also to improve the engagement between the packer 8 and the bracket 5 at the part spherical mating surfaces.

In the assembly method described previously, fastener holds are drilled off through the bracket 5 and the packer 8 so as to fasten the bracket 5 and packer 8 to the lower cover 3. However, the packer 8 may have predrilled fastener holes formed oversize such that when fastener holes are drilled off in the bracket 5 and/or cover 3 for the oversize holes in the packer 8 align with the fastener holes drilled in the bracket 5 and/or cover 3.

Whilst in the embodiment described above, the part spherical surface is formed in the bracket (the first component), it is contemplated that the part spherical surface may be machined in a separate component (the first component) which is attached to the bracket. This may be advantageous where it is easier to machine the part spherical surface in a separate component to be attached to the bracket, rather than machining the part spherical surface in the bracket itself, or where the material requirements for the part spherical surface are such that it may be undesirable to form the bracket having the part spherical surface as a unitary component.

Figure 8:
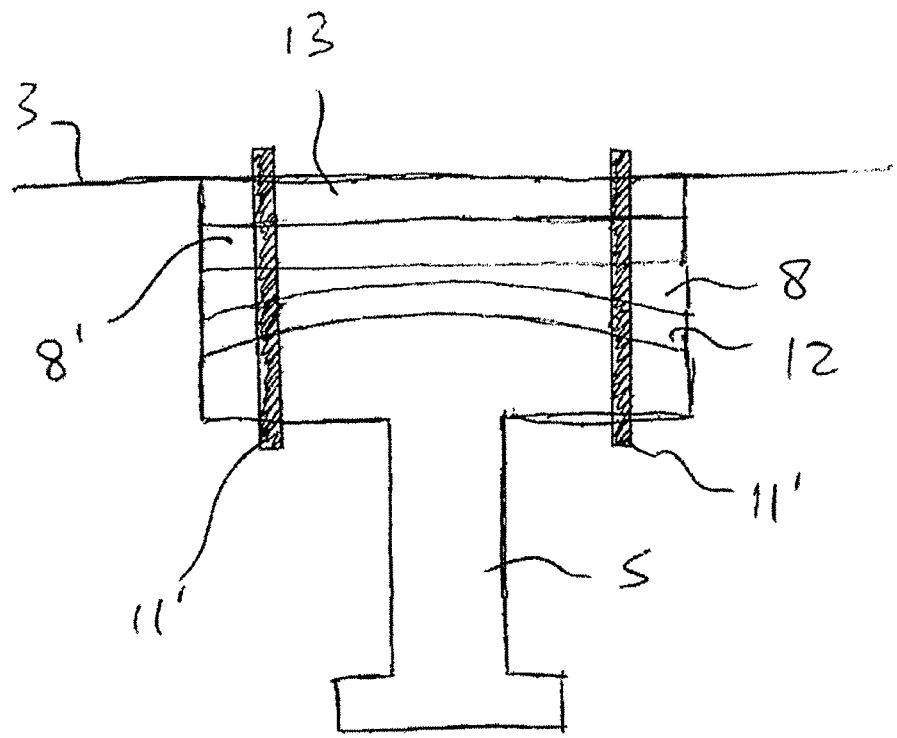
FIG. 8 illustrates a side view of an alternate embodiment.

FIG. 8 shows a cross-section through an alternative embodiment of the invention, and the same reference numerals have been used for components which correspond to those in the preceding figures. The embodiment of FIG. 8 includes a second packer 8' between the packer 8 and the cover 3. FIG. 8 also depicts fasteners 11' attaching the bracket 5 to the cover 3."

Whilst in the above embodiment the invention has been described with reference to an attachment bracket for an aircraft wing rib to cover joint, it will be appreciated that this invention is not limited to this particular application and many other aerospace and non-aerospace applications are envisaged. For example, in marine applications where complex tolerances pose similar assembly problems, the spherical packer may be similarly employed. In these alternative applications, it will be appreciated that differing fastening requirements may apply and so it may be preferable to weld the packer between the components after the rotational tolerances have been washed out through sliding adjustment of the part spherical surfaces. Alternatively, the components having the packer therebetween may be bonded together.

Although the invention has been described above with reference to one or more preferred embodiments, it will be appreciated that various changes or modifications may be made without departing from the scope of the invention as defined in the appended claims.

The invention claimed is:

1. An aircraft wing assembly comprising:
   a wing box having a lower cover and a rear spar disposed at an aft side of the wing box;
   a cantilevered flap support rib which supports a moveable wing flap, the flap support rib being fixed to the rear spar;
   a rib-to-cover attachment bracket having a substantially planar upper mounting surface for attachment to a substantially planar lower surface of the flap support rib and a convex part-spherical upper mounting surface;
   a packer having an upper surface for mounting against the lower cover of the wing box and a concave part-spherical lower surface mating with and of substantially the same spherical radius as the part-spherical mounting surface of the attachment bracket;
   at least one fastener extending through aligned holes in the attachment bracket and the packer and into the lower cover of the wing box so as to non-moveably fix the wing box and the attachment bracket relative to one another; and
   at least one fastener extending through aligned holes in the attachment bracket and the flap support rib;
   wherein the mating part-spherical surfaces of the attachment bracket and the packer permit sliding adjustment between the attachment bracket and the packer prior to fixing the attachment bracket and wing box to one another via the fasteners.

2. An assembly according to claim 1, further comprising a second packer disposed between the packer and the lower cover of the wing box.

3. An assembly according to claim 1, wherein the packer has oversized holes which receive the fasteners.

4. An assembly according to claim 1, wherein the part-spherical surfaces are formed by machining.

5. An assembly according to claim 1, wherein the packer is made of Titanium, corrosion resistant steel or Aluminum alloy.

6. An assembly according to claim 1, wherein the attachment bracket is made of Aluminum.

7. An assembly according to claim 1, further comprising a sealant layer disposed between the packer and each of the lower cover of the wing box and the attachment bracket.

* * * * *